United States Patent
Hubner et al.

(10) Patent No.: US 9,026,770 B2
(45) Date of Patent: May 5, 2015

(54) CONTEXT-SENSITIVE USER DEVICE CONTROL PROFILE

(75) Inventors: Paul V. Hubner, McKinney, TX (US);
Robert A. Clavenna, Lucas, TX (US);
Kristopher Pate, Sachse, TX (US);
Steven T. Archer, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 694 days.

(21) Appl. No.: 12/850,992

(22) Filed: Aug. 5, 2010

(65) Prior Publication Data
US 2012/0036344 A1    Feb. 9, 2012

(51) Int. Cl.
*G06F 15/177* (2006.01)
*H04M 1/725* (2006.01)
*G06F 9/445* (2006.01)

(52) U.S. Cl.
CPC ......... *H04M 1/72569* (2013.01); *G06F 9/4451* (2013.01); *H04M 1/72577* (2013.01)

(58) Field of Classification Search
CPC .... G06F 9/44505; G06F 9/4451; H04W 4/02; H04W 4/021; H04W 4/025; H04W 4/043
USPC ............. 713/1, 100; 455/456.3; 709/220, 221
See application file for complete search history.

(56) References Cited

U.S. PATENT DOCUMENTS

| | | | |
|---|---|---|---|
| 7,006,817 B2 * | 2/2006 | Awada et al. ................. 455/411 |
| 7,209,705 B2 * | 4/2007 | Moles et al. ................. 455/41.2 |
| 7,221,939 B2 * | 5/2007 | Ylitalo et al. .............. 455/435.1 |
| 7,224,963 B2 * | 5/2007 | Anderson et al. .......... 455/414.3 |
| 7,248,835 B2 * | 7/2007 | Fan et al. ..................... 455/63.1 |
| 7,496,352 B2 * | 2/2009 | Kaminsky et al. ......... 455/412.2 |
| 7,697,943 B2 * | 4/2010 | Jung .......................... 455/456.3 |
| 7,881,708 B2 * | 2/2011 | Anttila et al. ................. 455/418 |
| 8,040,233 B2 * | 10/2011 | Adappa et al. ................ 340/522 |
| 2002/0142792 A1 * | 10/2002 | Martinez ....................... 455/550 |
| 2003/0006912 A1 * | 1/2003 | Brescia ......................... 340/990 |
| 2007/0111726 A1 * | 5/2007 | Lambert et al. ............ 455/432.1 |
| 2009/0106542 A1 * | 4/2009 | Dubs et al. ........................ 713/1 |
| 2009/0170552 A1 * | 7/2009 | Lin ............................. 455/550.1 |
| 2009/0305674 A1 * | 12/2009 | Teittinen et al. ............. 455/411 |

* cited by examiner

*Primary Examiner* — Dennis M Butler

(57) ABSTRACT

A method including receiving control profile information that controls one or more operations of a user device during an event associated with a user; generating a control profile based on the control profile information; controlling the one or more operations of the user device based on the control profile for a duration of the event; and automatically setting the user device to a previous state or a new state after the event transpires.

25 Claims, 20 Drawing Sheets

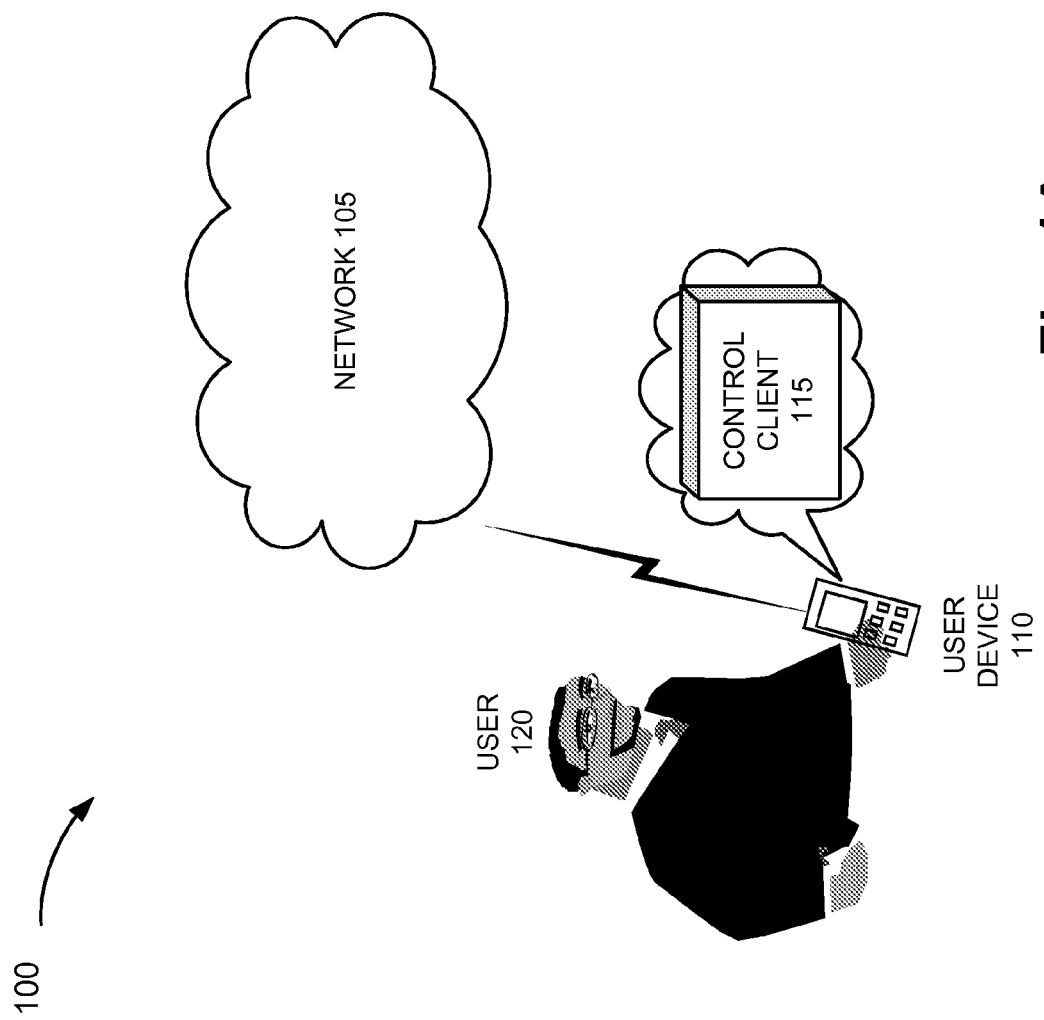

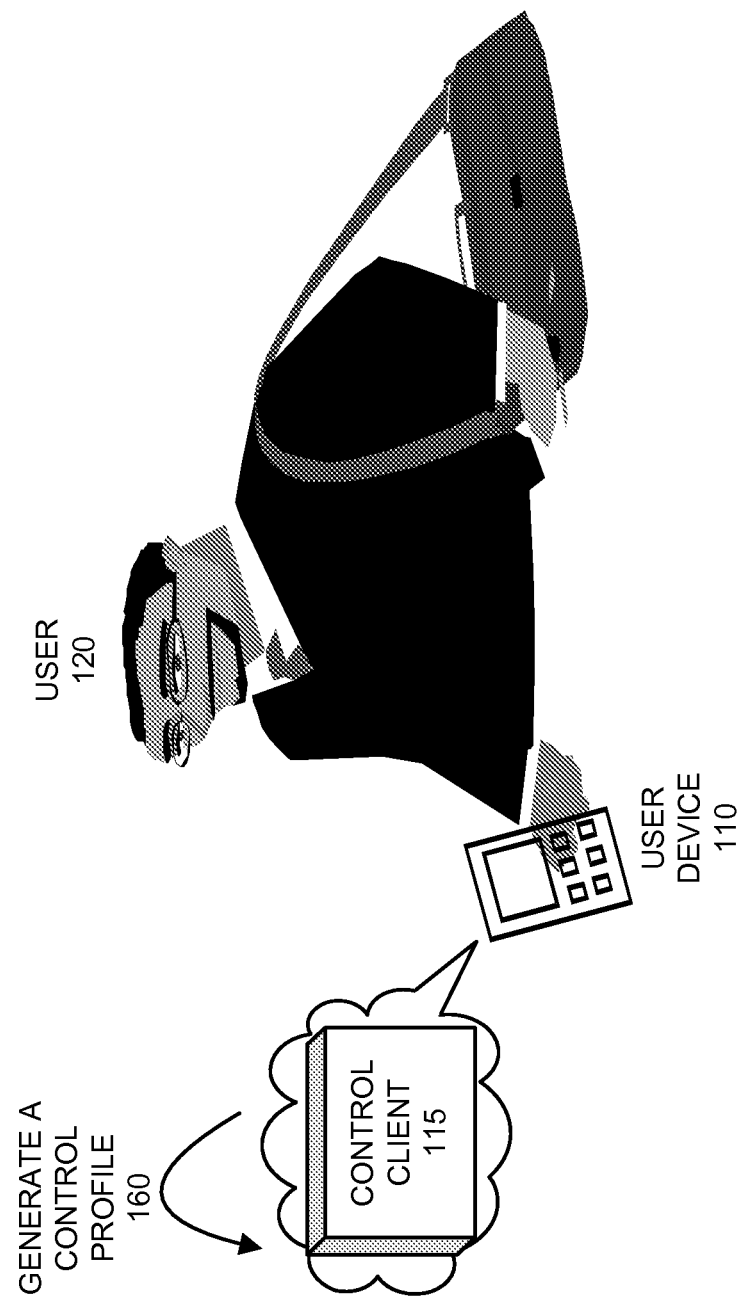

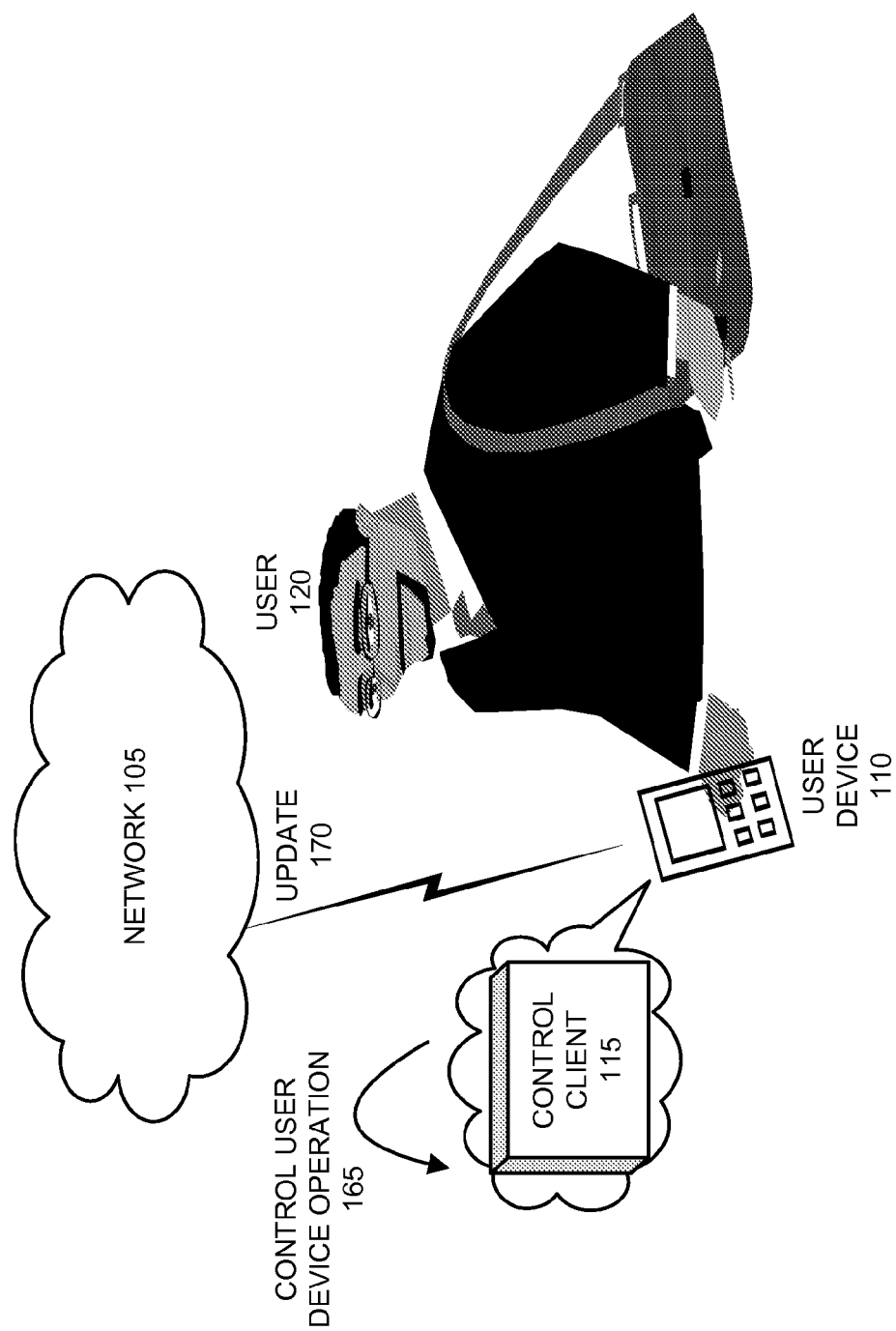

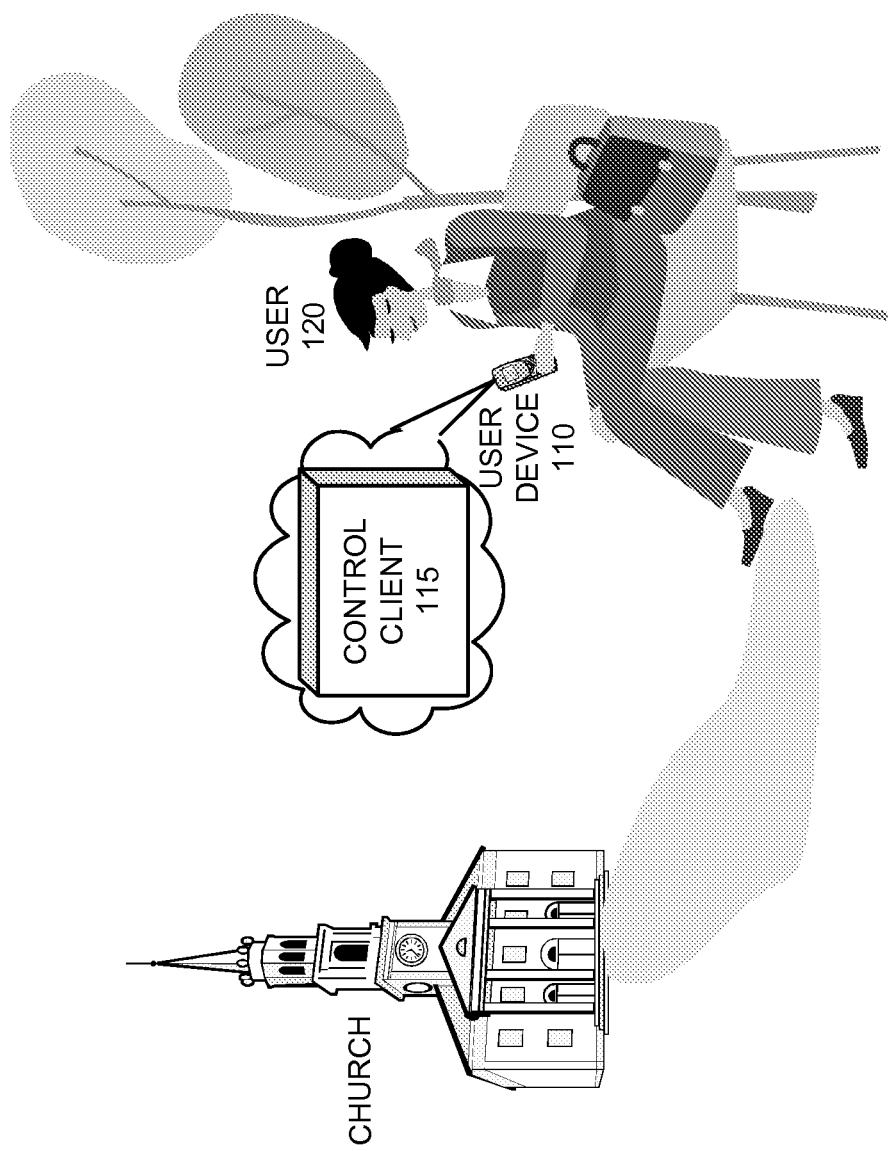

CONTEXT-SENSITIVE USER DEVICE CONTROL PROFILE

BACKGROUND

Mobile phones allow users to manually configure ringtones and other forms of alerts. For example, a user may assign a particular ringtone to incoming calls from a particular individual. In this way, the user may identify the caller. Additionally, the user may manually configure other settings associated with the user device (e.g., silent mode, etc.).

BRIEF DESCRIPTION OF THE DRAWINGS

FIG. 1A is a diagram illustrating an exemplary environment in which an exemplary embodiment of a control client using an control profile may be implemented;

FIGS. 1B-1G are diagrams illustrating exemplary processes associated with the control client controlling the operation of a user device based on the control profile;

FIGS. 5A-5F are diagrams illustrating exemplary scenarios in which a user may use the control client;

DETAILED DESCRIPTION OF PREFERRED EMBODIMENTS

Figure 1B:

The following detailed description refers to the accompanying drawings. The same reference numbers in different drawings may identify the same or similar elements. Also, the following detailed description does not limit the invention.

The term "control profile," as used herein, is intended to be broadly interpreted to include information that sets the user device into a particular state during an event (e.g., controls the operation(s) of a user device during the event and sets the user device to a new state or a previous state after the event transpires. By way of example, the control profile may include information, such as, auditory setting information, visual setting information, tactile setting information, location information, event information (e.g., start time of an event, end time of an event, etc.), user device mode information (e.g., silent mode, airplane mode, etc.), state information (e.g., previous user device state information, new user device state information), non-local setting information (e.g., user-presence setting information (e.g., Instant Messaging (IM) status of the user, social network status, etc.) etc.), and/or the like.

The term "event," as used herein, is intended to be broadly interpreted to include an occurrence or a happening of something. By way of example, the event may be a user-contextual event, such as, a personal event (e.g., the user attending an entertainment event (e.g., a movie, a play, etc.), the user attending church, the user attending a sporting event, etc), a business event (e.g., the user attending a meeting, the user flying in an airplane, etc.), or some other type of event or activity associated with the user.

According to exemplary embodiments, a control client may control the operation of the user device during an event based on the control profile. According to exemplary embodiments, the user device may receive information to generate the control profile. For example, the control client may receive control profile information in various ways, such as, the user manually entering control profile information into the user device, the user taking a picture or a video that includes control profile information, the user device receiving a message from a network (e.g., a broadcast message), or the user sending a message to a network and receiving a response from the network that includes control profile information. The control profile information may include, for example, a start time of an event, an end time of an event, a duration of an event, a date of an event, a time zone in which an event takes place, a location associated with an event (e.g., an address, etc.), user device settings (e.g., volume setting, vibrational setting, visual setting, user device mode setting, power setting, communication setting, etc.), and/or other types of information (e.g., running late information, leeway in duration of event, etc.).

According to the exemplary embodiments, the control client may not only control the operation of the user device during the event, but also automatically set the user device back to a previous state or a new state once the event transpires. In this way, the user may not have to manually configure the user device to a state (e.g., a normal state, a default state, etc.) that existed before the event, or alternatively a new state, once the event transpires. Additionally, according to the exemplary embodiments, the control profile may be generated ad hoc and/or impromptu in various ways, as described herein. However, the control profile may also be generated for an event that occurs on a regular basis (i.e., on a periodic schedule, etc.).

FIG. 1A is a diagram illustrating an exemplary environment in which an exemplary embodiment of a control client using a control profile may be implemented. As illustrated in FIG. 1A, environment 100 may include a network 105, a user device 110 that includes a control client 115, and a user 120. The number of devices and configuration in environment 100 is exemplary and provided for simplicity. In practice, environment 100 may include more devices, different devices, and/or differently arranged devices than those illustrated and described with respect to FIG. 1A. Additionally, or alternatively, environment 100 may include additional networks, fewer networks, and/or different networks than those illustrated and described with respect to FIG. 1A. Additionally, or alternatively, according to other embodiments, a function described as being performed by user device 110 may be performed by a different device or a combination of devices. In this example, user device 110 may establish a wireless connection with network 105.

Network 105 may include one or multiple networks of a variety of types. For example, network 105 may include a wireless network (e.g., a cellular network, a mobile network, a non-cellular network, a radio network, etc.). For example, network 105 may include a Long Term Evolution (LTE) network, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a second generation (2G)

network, a 3G network, a 4G network, and/or another type of wireless network (e.g., an ad hoc network, an Evolution-Data Optimized (EVDO network, a Bluetooth network, a wireless local area network (WLAN), etc.).

According to some embodiments, user device 110 may include a device capable of communicating with another device, network, and/or system. According to other embodiments, user device 110 may include a device incapable of communicating with another device, network, and/or system (e.g., a stand-alone device). User device 110 may take the form of a portable device, a mobile device, or a handheld device. By way of example, user device 110 may include various functions, such as, a telephone, a data organizer, picture capturing, video capturing, a computer, Web-access, music playing, location-awareness, and/or gaming. As previously described, user device 110 may include control client 115. Control client 115 may use control profiles to control the operation of user device 110 when an event occurs. Control client 115 will be described further below.

Figure 1C:
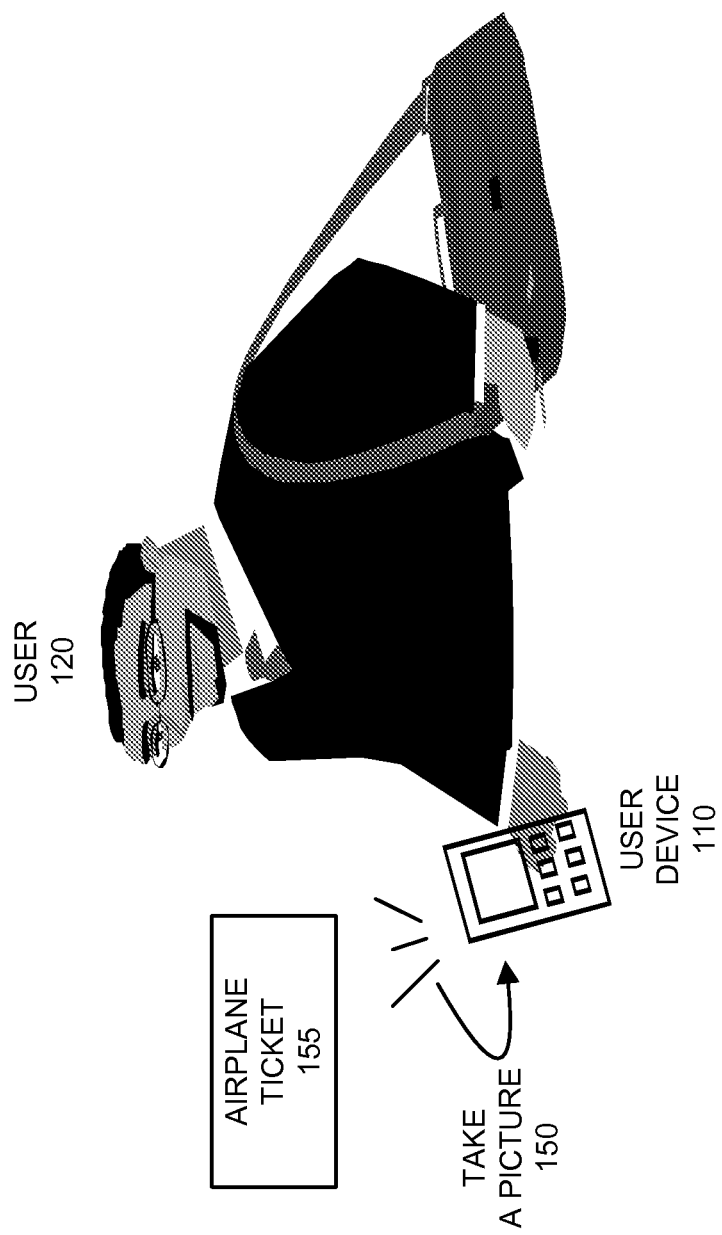

FIGS. 1B-1G are diagrams illustrating exemplary processes associated with control client 115 controlling the operation of user device 110 based on a control profile. As illustrated in FIG. 1B, it may be assumed that user 120 is in an airport getting ready to go through security and board his plane. At this time, user 120 may wish to enter information into user device 110 to allow control client 115 to create the control profile. Referring to FIG. 1C, according to an implementation, user 120 may take a picture 150 of an airplane ticket 155. As illustrated in FIG. 1D, control client 115 of user device 110 may generate a control profile 160 based on picture 150. For example, control client 115 may process/scan picture 150 and may identify a barcode associated with airplane ticket 155 and/or identify other textual information (departure time, arrival time, location information, etc.) printed on airplane ticket 155. Additionally, or alternatively, user 120 may enter information (e.g., text input, voice command, etc.) pertaining to the flight and which control client 115 may use to generate control profile 160. Additionally, control client 115 may use location information (e.g., user 120 being in the airport) to generate control profile 160 when user device 110 is a location-aware device.

Figure 1F:
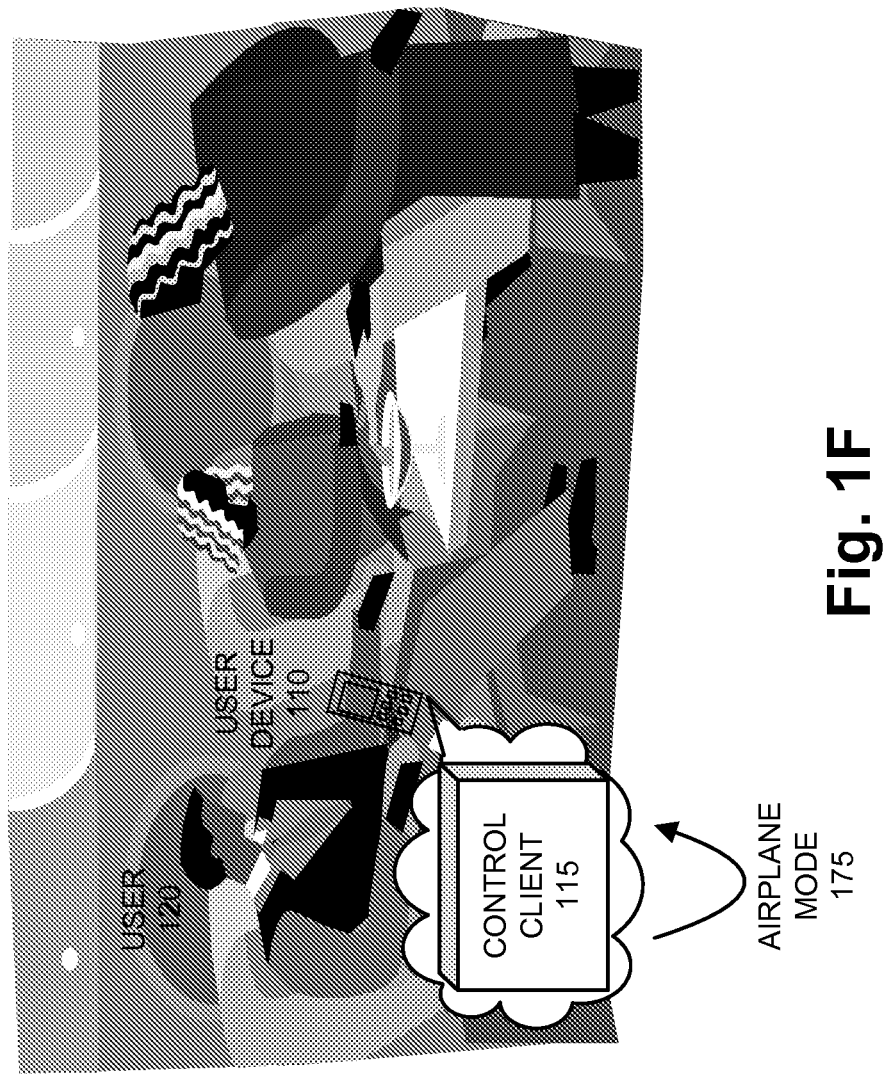
Figure 1G:
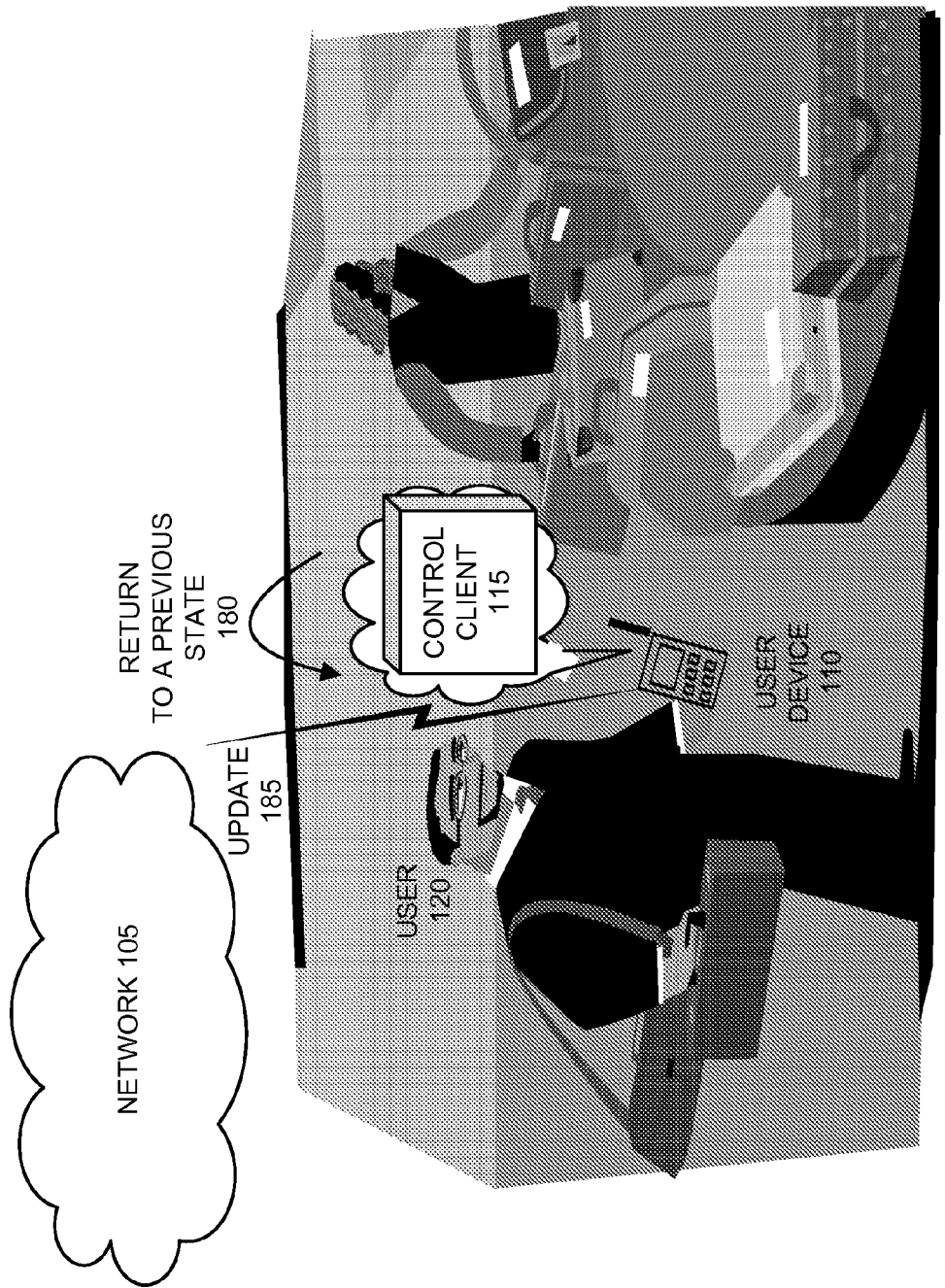

Referring to FIG. 1E, control client 115 may control user device 110 operation 165 based on control profile 160 when the event begins. According to some embodiments, control client 115 may also update 170 user's 120 profile to one or multiple service providers via network 105. For example, non-local settings (e.g., IM status, online calendar settings, general user 120 status (e.g., busy, unavailable, etc.), etc.) may be updated to match control profile 160 for the duration of the event (i.e., user's 120 flight in the airplane). As illustrated in FIG. 1F, during the flight, user device 110 may operate based on control profile 160. For example, user device 110 may operate in an airplane mode 175 (e.g., disabling wireless communication abilities, such as sending or receiving calls, messages, browsing the Internet, etc.). Referring to FIG. 1G, when user 120 completes his flight and is in the baggage area to retrieve luggage, control client 115 may return to a previous state 180. According to other embodiments, control client 115 may enter a new state. For example, user 120 may specify a state to which control client 115 may set user device 110 to enter when the airplane lands at the destination. Additionally, as illustrated in FIG. 1G, control client 115 may update 185 user's 120 profile change via network 105.

Since exemplary embodiments have been broadly described, a more detailed description is provided below. As a result of the foregoing, a user may not have to manually configure a user device for a specific event, as well as, not having to manually configure the user device to a state (e.g., a normal state, a default state, etc.) that existed before the event, or alternatively a new state, once the event transpires. Additionally, the control profile may be generated ad hoc and/or impromptu in various ways, as described herein.

Figure 2:
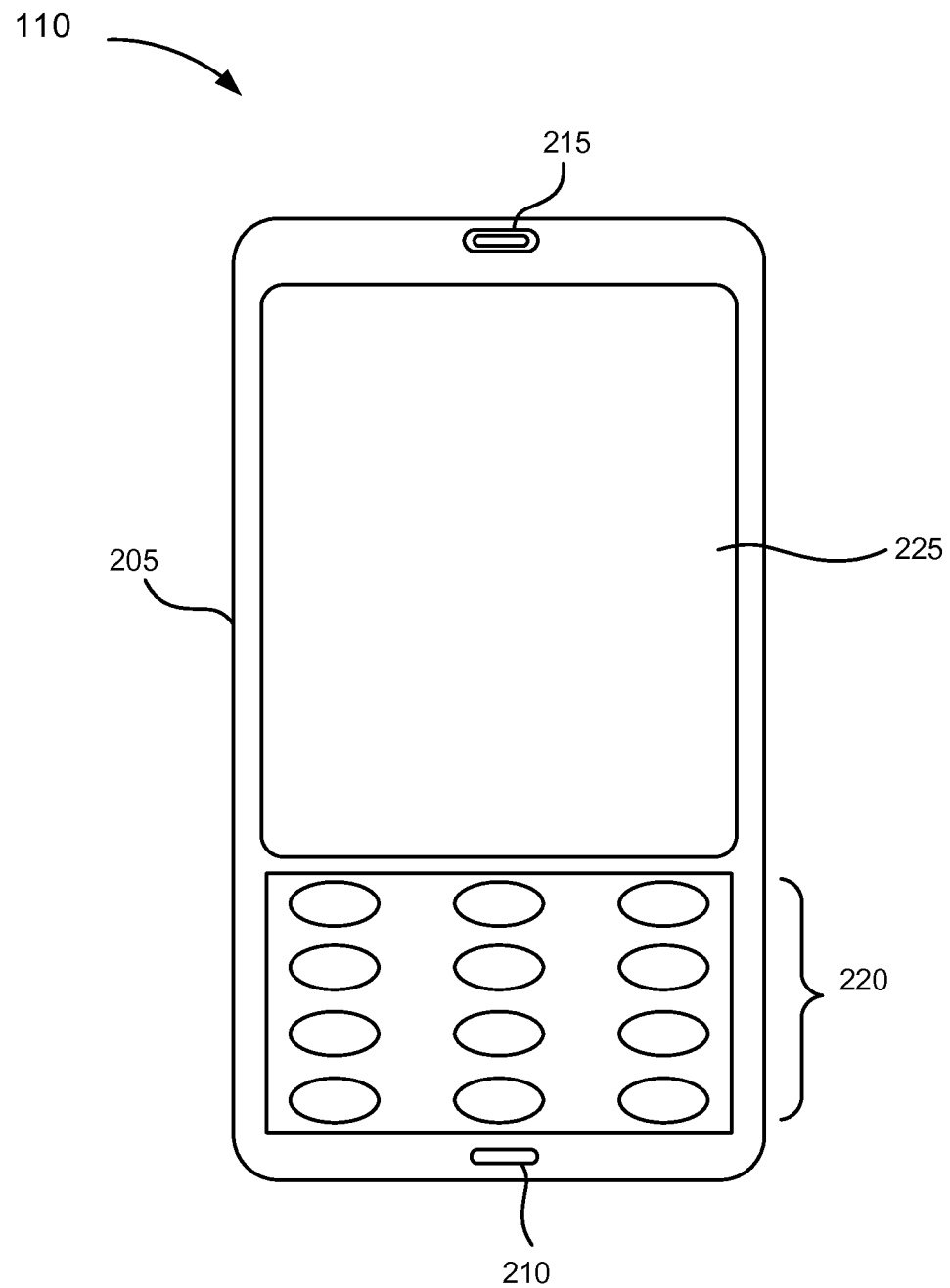
FIG. 2 is a diagram illustrating an exemplary user device in which exemplary embodiments described herein may be implemented.

FIG. 2 is a diagram illustrating an exemplary user device 110 in which exemplary embodiments described herein may be implemented. As illustrated in FIG. 2, user device 110 may comprise a housing 205, a microphone 210, speakers 215, keys 220, and a display 225. According to other embodiments, user device 110 may comprise fewer components, additional components, different components, and/or a different arrangement of components than those illustrated in FIG. 2 and described herein. For example, in some implementations, user device 110 may include a camera, a video capturing component, and/or a location-aware component (e.g., Global Positioning System (GPS) receiver, etc.). Additionally, user device 110 may take the form of a different configuration (e.g., a slider device, a clamshell device, etc.) than the configuration illustrated in FIG. 2.

Housing 205 may comprise a structure to contain components of user device 110. For example, housing 205 may be formed from plastic, metal, or some other type of material. Housing 205 may support microphone 210, speakers 215, keys 220, and display 225.

Microphone 210 may transduce a sound wave to a corresponding electrical signal. For example, a user may speak into microphone 210 during a telephone call or to execute a voice command. Speakers 215 may transduce an electrical signal to a corresponding sound wave. For example, a user may listen to music or listen to a calling party through speakers 215.

Keys 220 may provide input to user device 110. For example, keys 220 may comprise a standard telephone keypad, a QWERTY keypad, and/or some other type of keypad (e.g., a calculator keypad, a numerical keypad, etc.). Keys 220 may also comprise special purpose keys to provide a particular function (e.g., send, call, e-mail, etc.).

Display 225 may operate as an output component. For example, display 225 may comprise a liquid crystal display (LCD), a plasma display panel (PDP), a field emission display (FED), a thin film transistor (TFT) display, or some other type of display technology.

Additionally, according to an exemplary implementation, display 225 may operate as an input component. For example, display 225 may comprise a touch-sensitive screen. In such instances, display 225 may correspond to a single-point input device (e.g., capable of sensing a single touch) or a multipoint input device (e.g., capable of sensing multiple touches that occur at the same time). Further, display 225 may be implemented using a variety of sensing technologies, including but not limited to, capacitive sensing, surface acoustic wave sensing, resistive sensing, optical sensing, pressure sensing, infrared sensing, or gesture sensing. Display 225 may be capable of displaying text, pictures, and/or video. Display 225 may also be capable of displaying various images (e.g., icons, objects, etc.) that may be selected by a user to access various applications, enter data, and/or navigate, etc.

Figure 3:
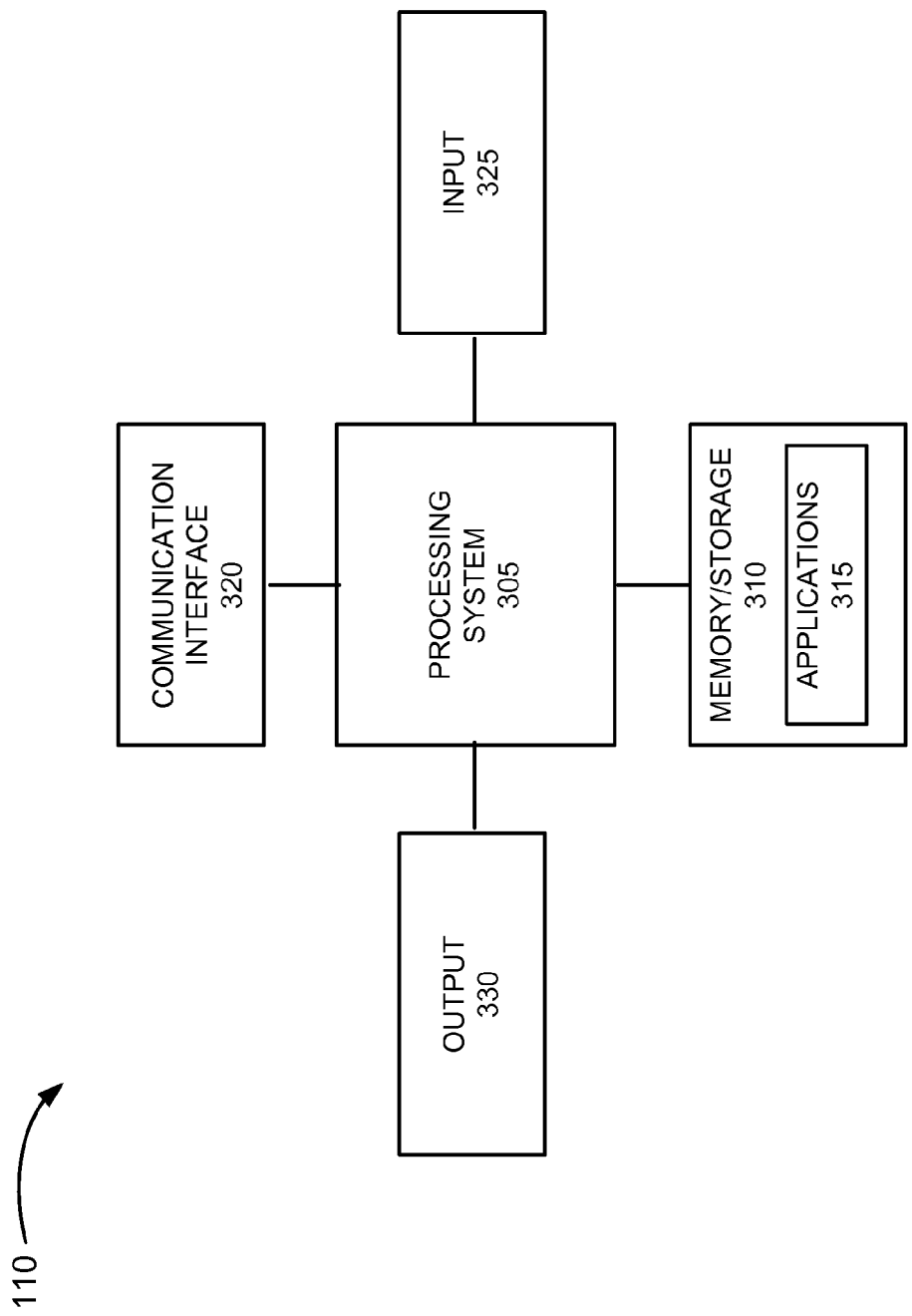
FIG. 3 is a diagram illustrating exemplary components of the user device.

FIG. 3 is a diagram illustrating exemplary components of user device 110. As illustrated, user device 110 may include a processing system 305, memory/storage 310 including applications 315, a communication interface 320, an input 325, and a output 330. According to other embodiments, user device 110 may include fewer components, additional components, different components, and/or a different arrangement of components than those illustrated in FIG. 3 and described herein. For example, user device 110 may not include communication interface 320.

Processing system 305 may include one or multiple processors, microprocessors, data processors, co-processors, application specific integrated circuits (ASICs), system-on-chips (SOCs), controllers, programmable logic devices (PLDs), chipsets, field programmable gate arrays (FPGAs), or some other component or processing logic that may interpret and/or execute instructions and/or data. Processing system 305 may control the overall operation, or a portion of operation(s) performed by user device 110. Processing system 305 may perform one or multiple operations based on an operating system and/or various applications (e.g., applications 315). Processing system 305 may access instructions from memory/storage 310, from other components of user device 110, and/or from a source external to user device 110 (e.g., another device, a network, etc.).

Memory/storage 310 may include one or multiple memories and/or one or multiple secondary storages. For example, memory/storage 310 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), or the like). Memory/storage 310 may include a hard disk (e.g., a magnetic disk, an optical disk, a magneto-optic disk, a solid state disk, etc.) or some other type of computer-readable medium, along with a corresponding drive. Memory/storage 310 may be external to and/or removable from user device 110, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 310 may store data, application(s), and/or instructions related to the operation of user device 110.

Applications 315 may include software that provides various services or functions. For example, applications 315 may include a telephone application, a voice recognition application, a video-playing application, a texting application, an instant messaging application, a Web Browser application, etc. According to one implementation, control client 115 may take the form of applications 315.

Communication interface 320 may permit user device 110 to communicate with other devices, networks, systems and/or the like. For example, communication interface 320 may include one or multiple wireless interfaces and/or wired interfaces. Communication interface 320 may include one or multiple transmitters, receivers, and/or transceivers. Communication interface 320 may operate according to one or multiple protocols, communication standards, and/or the like.

Input 325 may permit an input into user device 110. For example, input 325 may comprise a keyboard, a keypad (e.g., keys 220), a touch screen (e.g., display 225), a touch pad, a button, a port, a switch, a microphone (e.g., microphone 210), a camera, a video capturing component, and/or some other input component. Output 330 may permit user device 110 to provide an output. For example, output 330 may comprise speakers (e.g., speakers 215), a display (e.g., display 225), one or more light emitting diodes (LEDs), an output port, a vibratory mechanism, and/or some other type of output component.

According to one implementation, user device 110 may perform processes in response to processing system 305 executing software instructions stored in memory/storage 310. For example, the software instructions may be read into memory/storage 310 from another memory/storage 310 or from another device via communication interface 320. The software instructions stored in memory/storage 310 may cause processing system 305 to perform processes described herein. Alternatively, according to other implementations, user device 110 may perform processes based on the execution of hardware (e.g., processing system 305, etc.), the execution of hardware and firmware, or the execution of hardware, software (e.g., applications 315), and firmware.

Figure 4A:
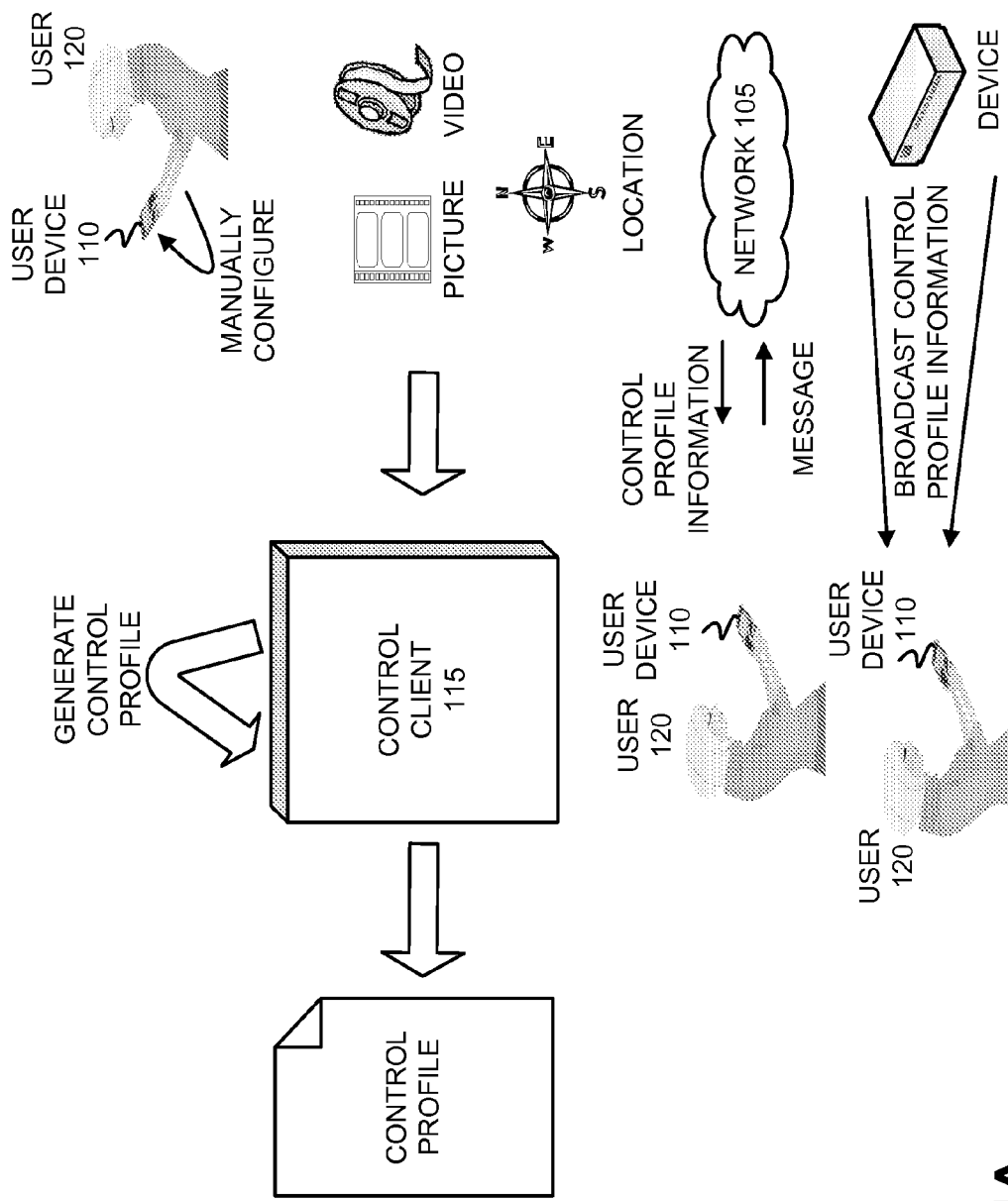
FIGS. 4A-4C are diagrams illustrating an exemplary functional component of the user device and processes associated therewith.

As previously described, control client 115 may control the operation of user device 110 based on a control profile. FIG. 4A is a diagram illustrating an exemplary functional component associated with an exemplary embodiment of user device 110. Control client 115 may be implemented as a combination of hardware (e.g., processing system 305, etc.) and software (e.g. applications 315, etc.) based on the components described with respect to FIG. 3 and/or elsewhere in this description. Alternatively, control client 115 may be implemented as hardware and firmware, hardware, software, and firmware, or software.

Referring to FIG. 4A, control client 115 may control the operation of user device 110 based on the control profile. According to an exemplary embodiment, control client 115 may generate the control profile based on various forms of information received from various sources. For example, user 120 may enter control profile information via keypad 220, display 225, etc., and/or speech input (e.g., user 120 speaking into microphone 210). Additionally, or alternatively, user 120 may take/capture a picture and/or a video which may include control profile information. As an example, user device 110 may scan the picture and/or the video and perform object recognition processes, text recognition processes, etc., to elicit control profile information from the picture and/or the video.

Additionally, or alternatively, according to an exemplary implementation, user device 110 may include a location-aware component and/or obtain location information (e.g., from a network, a user, etc.) that may be used to generate the control profile. Additionally, or alternatively, according to another exemplary implementation, user 120 may transmit a message and in response may receive control profile information. For example, user 120 may send a control profile request message (e.g., a short messaging service (SMS) message, etc.) to a number or a short code, and in response, receive control profile information. Additionally, according to an exemplary implementation, user device 110 and/or the response device may perform validation processes to ensure security, prevent unsolicited messages, etc. Additionally, or alternatively, according to yet another implementation, a device may provide control profile information to user device 110. For example, the device may wirelessly transmit control profile information for an event. By way of example, a device at a location (e.g., a movie theater, a funeral parlor, a sports arena, etc.) may broadcast control profile information to user device 110. The broadcast information may allow control client 115 to generate the control profile.

Figure 4B:
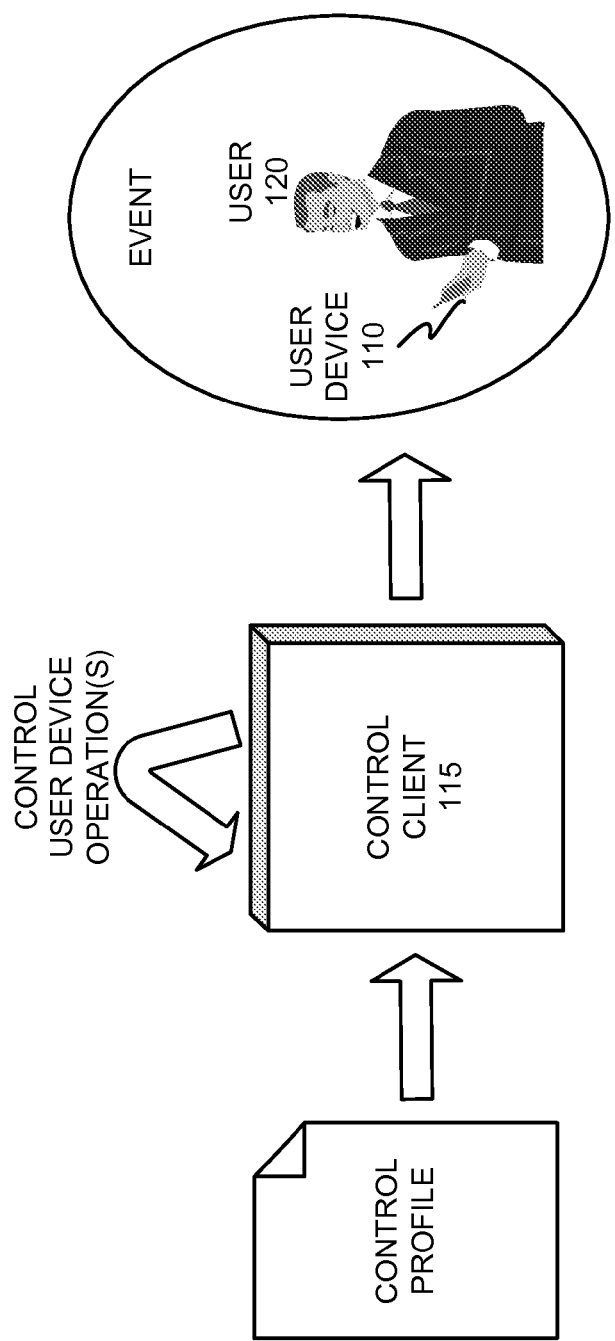

Referring to FIG. 4B, control client 115 may control user device 110 operation(s) during the event based on the generated control profile. According to an exemplary embodiment, the control profile may include event information (e.g., a start time of the event, an end time of the event, or a time duration of the event (e.g., 2 hours, etc.)). Additionally, or alternatively, location information may be used to determine when the event begins and ends. By way of example, control client 115 may control whether a cue is provided to user 120 when a message (e.g., a telephone call, a text message, an e-mail, etc.) is received, the type of cue, allow or prevent communication with other devices, power usage, and/or mode of user device 110.

Depending on the control profile, certain parameters associated with the operation of user device 110 may be static throughout the duration of the event or may change during the course of the event. By way of example, assume that an event, such as a sporting event, lasts approximately 2½ hours. The control profile may mute incoming message cues to the user during the first 15 minutes to account for the players being announced and/or the singing of the national anthem. Thereafter, incoming messaging cues may be un-muted or activated (e.g., vibration increased to a high level, an auditory cue increased to a high volume level) to compensate for the background noise associated with the user being in a sports arena (i.e., at the event).

Figure 4C:
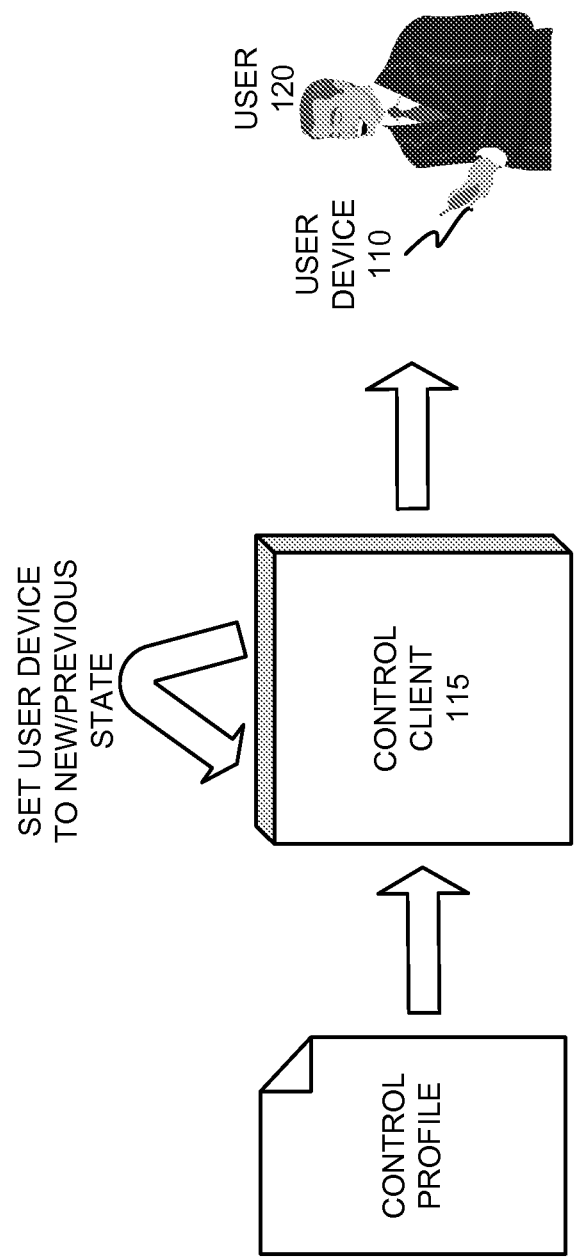

As illustrated in FIG. 4C, control client 115 may set user device 110 to a new or a previous state once the event transpires based on the control profile. For example, user device 110 may revert to a state that existed before the event occurred or may enter a new state.

Although FIGS. 4A-4C illustrate an exemplary functional component and processes associated therewith, according to other implementations, user device 110 may include additional functional components, different functional components, a different arrangement of functional components, and/or perform additional, fewer, and/or different processes than those illustrated in FIGS. 4A-4C and described herein.

Figure 5B:
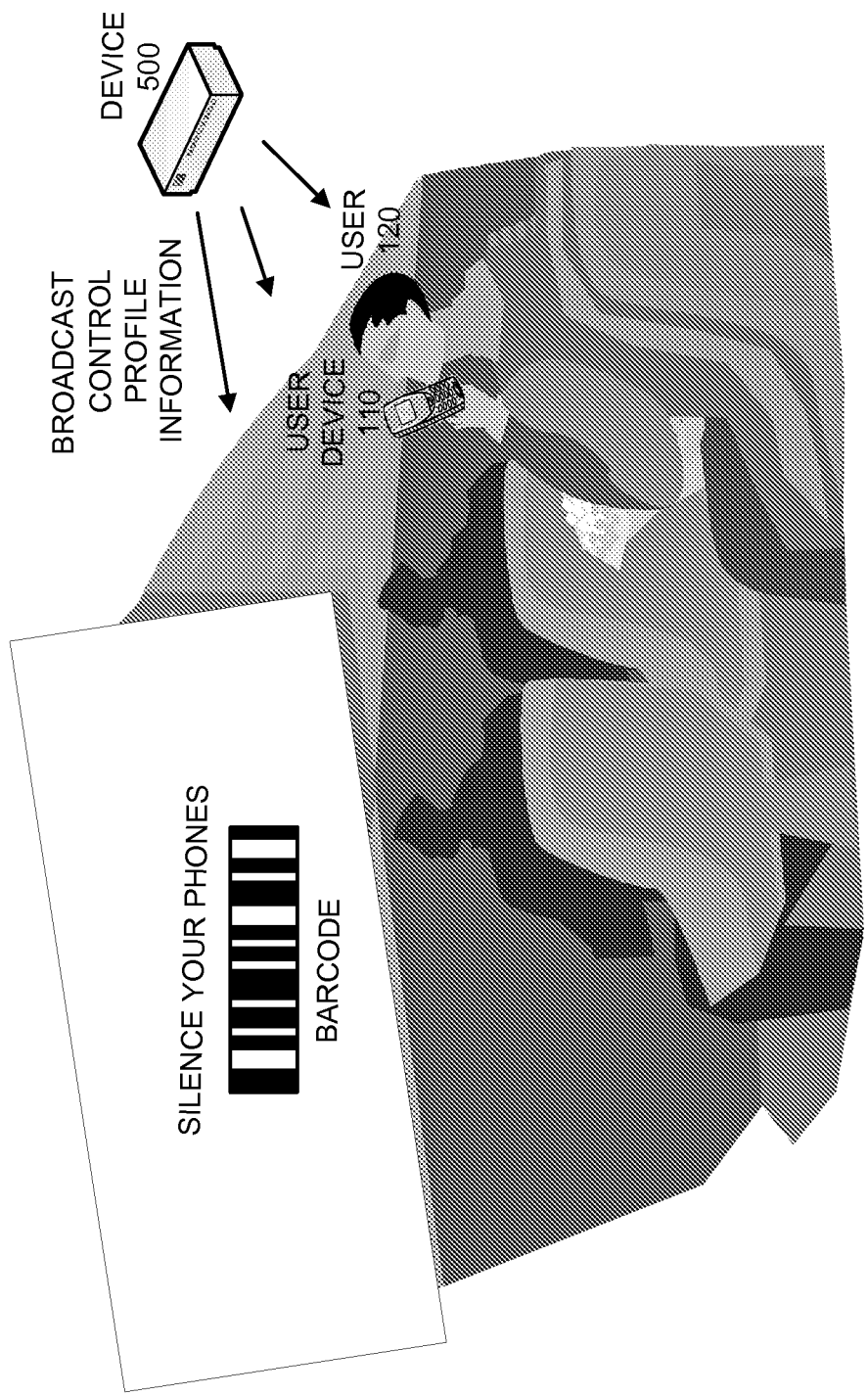
Figure 5C:
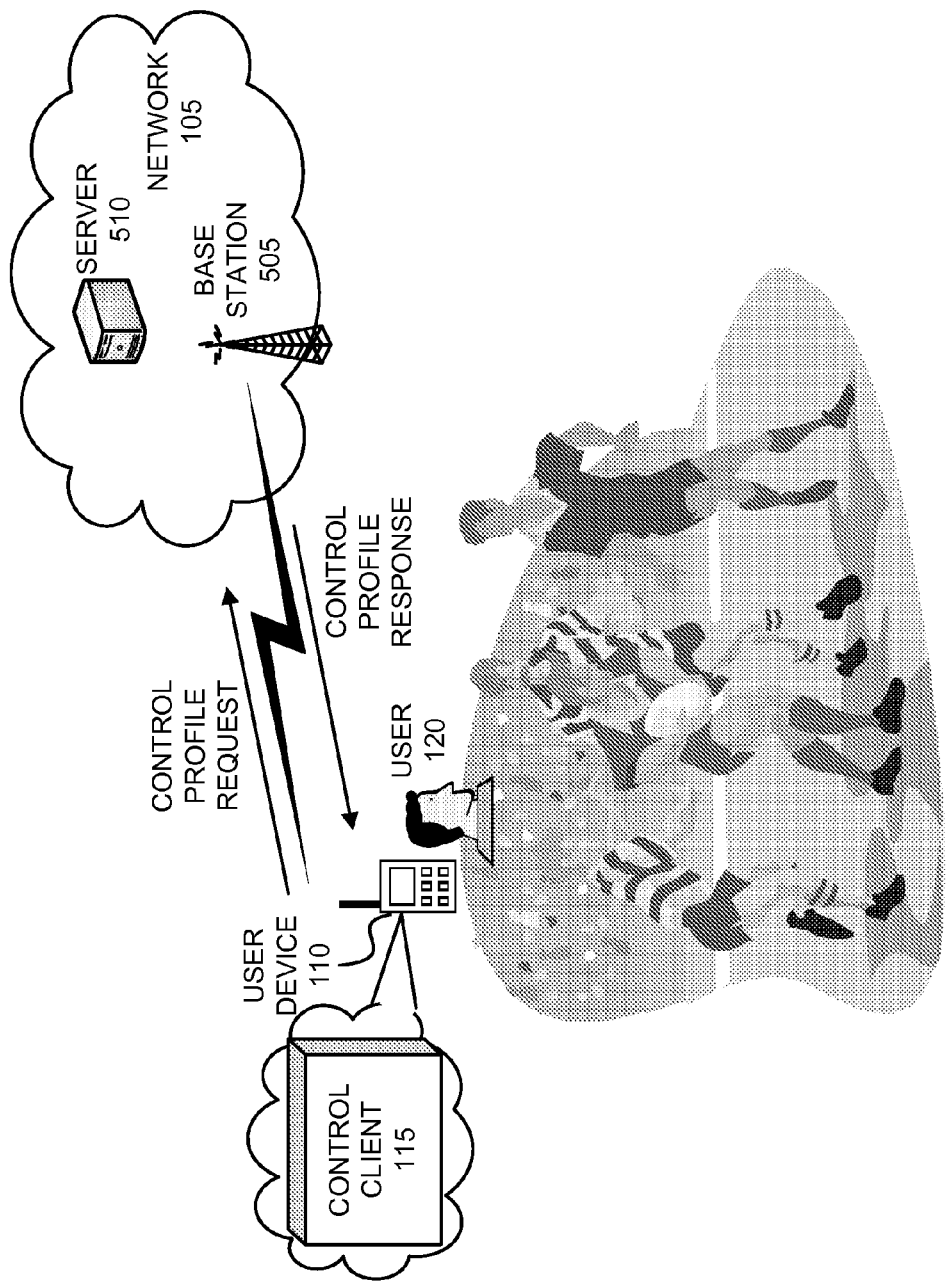

FIGS. 5A-5C are diagrams illustrating exemplary scenarios for user 120 to use control client 115. As illustrated in FIG. 5A, user 120 may be attending her church. According to an exemplary embodiment, user 120 may enter control profile information into user device 110. Control client 115 may generate a control profile and control user device 110 based on the control profile for the duration of the church service. According to another exemplary embodiment, user device 110 may include a user interface (e.g., a graphical user interface (GUI)) that allows user 120 to select from a menu. By way of example, the user interface may permit the user to select from options, such as, duration (e.g., 2 hours, 1 hour, etc.) or manually enter a time (e.g., 52 minutes), an event (e.g., a movie, a play, a meeting, a lecture, etc.), control profile (e.g., airplane mode, silent mode, etc.), and/or custom control profiles (e.g., previously configured by user 120 (e.g., vacation, in office, during commute, at home, etc.)).

According to an exemplary embodiment, control client 115 may also allow user 120 to manage events that are periodic. For example, user 120 may attend church every Sunday morning at 9 a.m. User 120 may configure control client 115 to automatically use a particular control profile each Sunday morning at 9 a.m.-10 a.m. At 10:01 a.m., control client 115 may automatically set user device 110 to a previous state or a new state (if the control profile specified a new state).

Referring to FIG. 5B, user 120 may be attending a movie. Prior to the movie beginning, the screen indicates to the audience to silence their user devices. In addition, the screen displays a barcode (e.g., a 1D barcode, a 2D barcode, a 3D barcode, a 4D barcode) or some other image for user 120 to photograph. User 120 may take a picture of the barcode or another image and control client 115 may receive the picture and generate a control profile. For example, as previously described, user device 110 may elicit control profile information by scanning the picture, etc. Control client 115 may control the operation of user device 110 during the course of the movie based on the control profile. After the movie finishes, control client 115 may automatically set user device 110 to a previous state or a new state (if the control profile specified a new state). According to another embodiment, control client 115 may receive a picture or a video via a communication (e.g., an e-mail, a text message, etc.).

According to another embodiment, user device 110 may receive a broadcast message from a device 500 (e.g., located in the movie theater). The broadcast message may include control profile information. User 120 may be prompted to accept the control profile setting(s) received from the broadcast message, and control client 115 may control user device 110 according to the control profile received. According to an exemplary embodiment, device 500 may automatically update the control profile when changes in the event occur (e.g., the start time is changed, the end time changes, etc.). Additionally, according to an exemplary embodiment, if user 120 leaves the event (e.g., the playing of the movie) early, the loss of the broadcast signal may cause control client 115 to set user device 110 to a previous state.

Figure 5D:
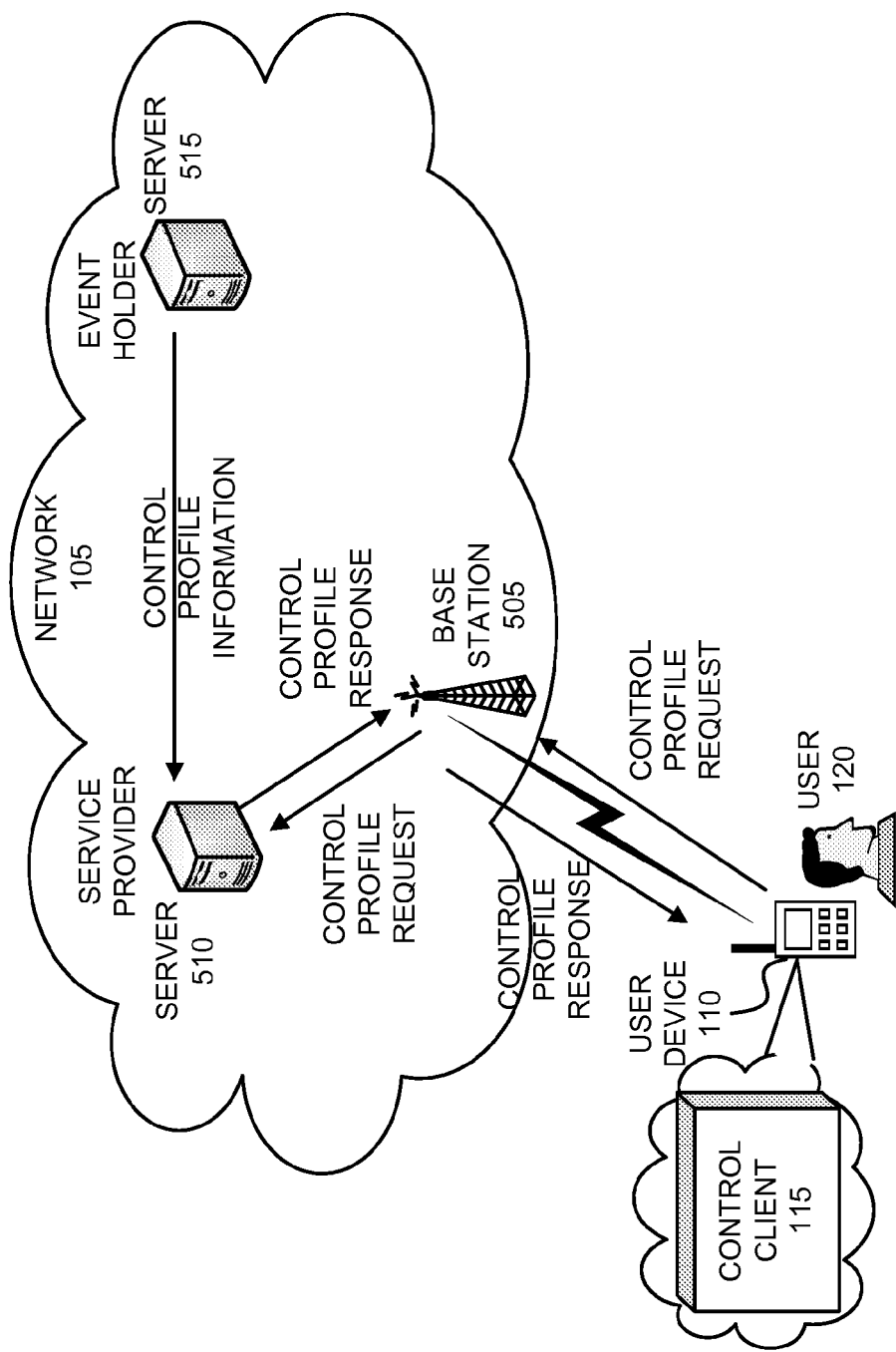

Referring to FIG. 5C, user 120 may be attending a sports event. User 120 may send a control profile request (e.g., a text message, a telephone call, etc.) that includes information available to user 120 or user device 110 (e.g., location information, a picture of a ticket, event information, etc.) to a server 510 (e.g., a service provider device) or some other type of device via base station 505. According to an exemplary embodiment, server 510 may perform a local look-up (e.g., in a database) to identify the event. For example, as illustrated in FIG. 5D, a server 515 (e.g., an event holder device, a device that stores control profile information, etc.) or some other type of device may be configured to provide server 510 with control profile information or a control profile. For example, server 515 may periodically or reactively (e.g., when event information changes, etc.) provide server 510 with control profile information or a control profile. When received, server 510 may store control profile information or control profiles in a database. Server 510 may select the appropriate control profile information or the appropriate control profile, for example, based on the control profile request received from user device 110 and a mapping associated with the database. In this way, when server 510 receives the control profile request, server 510 may provide user device 110 with a control profile response that includes control profile information or a control profile.

Although in this example, user 120 is described as attending the sports event, according to other embodiments, user 120 may send the control profile request any time period before the event (e.g., a week before the event, a month before the event, etc.), at the beginning of the event, or during the event. Additionally, according to an exemplary embodiment, server 510 may provide updates to the control profile information or control profile as changes relating to the event may occur. By way of example, weather conditions or other event-related conditions (e.g., cancellations, event host is running late, etc.) may change when the event starts (e.g., day, time, etc.), how long the event lasts, when the event ends, etc.

As previously described, when control client 115 receives the control profile response, user device 110 may operate according to the control profile or generate a control profile based on control profile information received. After the sporting event finishes, control client 115 may automatically set user device 110 to a previous state or a new state (if the control profile specified a new state).

Figure 5E:
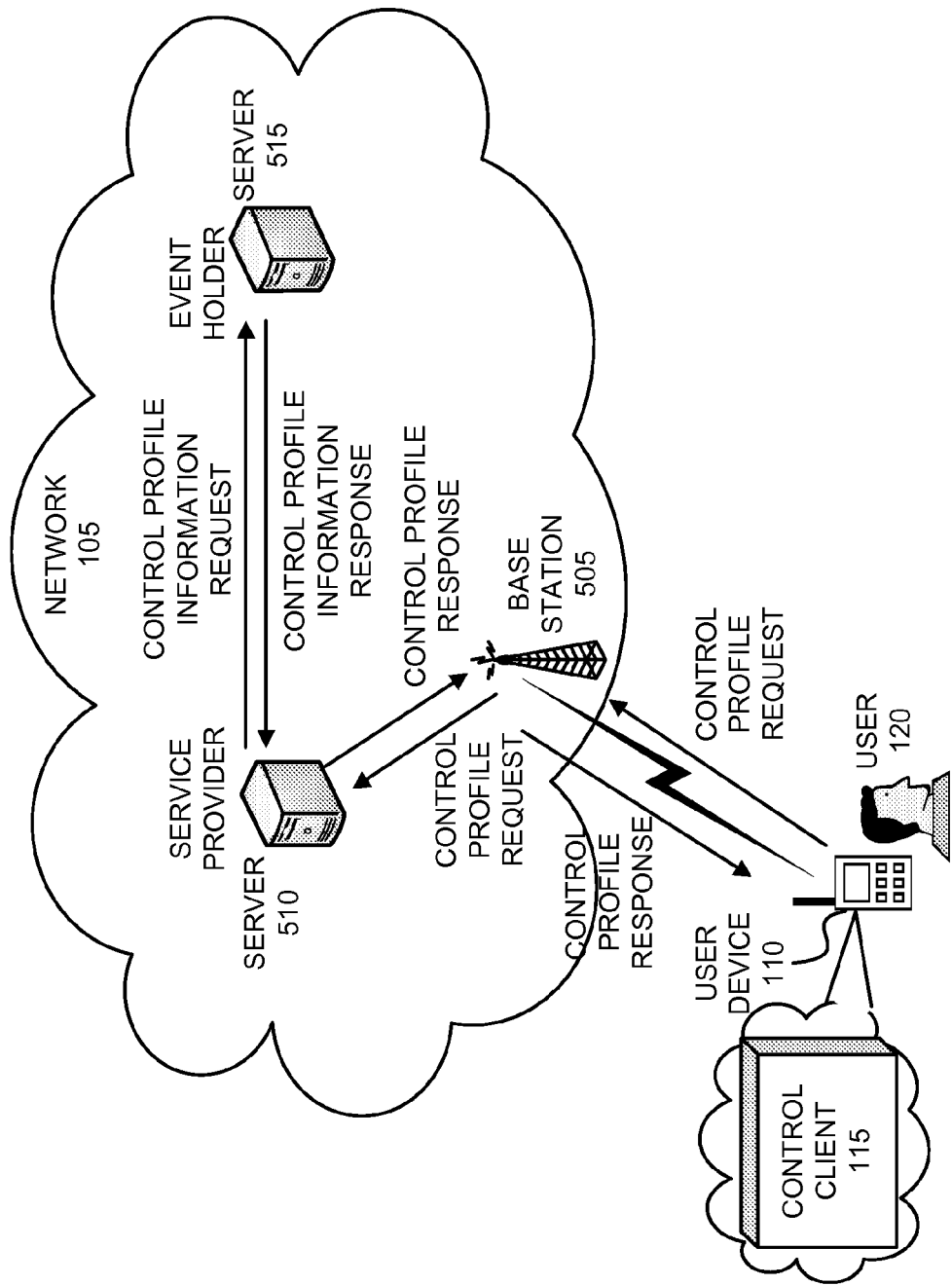

According to another exemplary embodiment, as illustrated in FIG. 5E, when server 510 receives the control profile request, server 510 may send a control profile information request to server 515. Server 515 may select appropriate control profile information or an appropriate control profile based on the control profile information request. Server 515 may provide a control profile information response to server 510. Server 510 may, in turn, provide a control profile response to user device 110 via base station 505.

According to an exemplary embodiment, in order to validate communications to user device 110 (e.g., to avoid spoofing of a user device, etc.), user's 120 service provider (e.g., server 510) may validate the event holder's control profile information or the control profile information response by comparing it to the corresponding control profile request from user device 110.

Figure 5F:
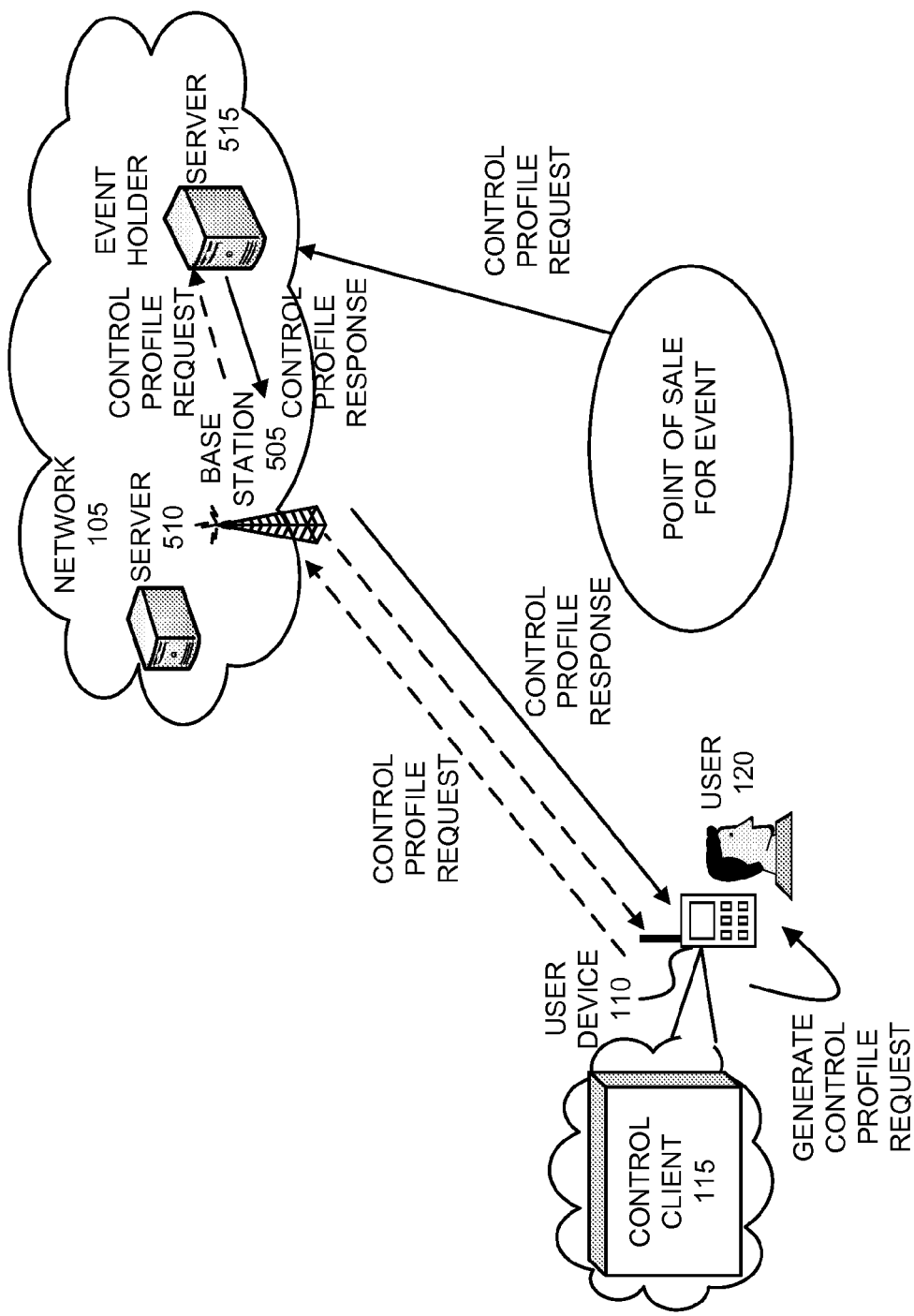

FIG. 5F is a diagram illustrating another exemplary scenario in which user 120 may use control client 115. For example, assume user 120 is conducting a transaction (e.g., purchasing a ticket) to attend an event. User 120 may conduct the transaction locally by going to a point of sale (POS) location (e.g., associated with the event holder), or remotely (e.g., accessing a POS system via a network). User 120 may use his/her credit card or other type of payment, or user device 110 may include an electronic purchasing platform to conduct the transaction.

According to an exemplary embodiment, control client 115 may receive control profile information or a control profile in response to the transaction. For example, according to an exemplary embodiment, from the POS or by the POS system, a control profile request may be sent to server 515. For example, the control profile request may include, among other types of event-related information) a communication address (e.g., a telephone number of user device 110, an e-mail address, etc.) associated with user device 110. In turn, server 515 may send a control profile response to user device 110.

According to another exemplary embodiment, for example, when user device 110 includes an electronic payment platform, user device 110 may automatically (or based on user input) generate a control profile request. User device 110 may send the control profile request to server 515 via base station 505. In response, server 515 may send a control profile response to user device 110. According to other embodiments, the control profile request and/or the control profile response may be communicated via server 510.

The number of devices, the type of devices, configuration associated with the devices, the content of a message, the type of message, the path of a message, etc., illustrated in FIGS. 5A-5F and described herein are exemplary and provided for simplicity. In practice, user device 110 may receive the control profile or the control profile information based on additional devices, fewer devices, different devices, differently arranged devices, different messaging, etc., than that illustrated and described with respect to FIGS. 5A-5F. Additionally, or alternatively, according to other embodiments, a function described as being performed by user device 110 or some other device may be performed by a different device or a combination of devices.

Figure 6:
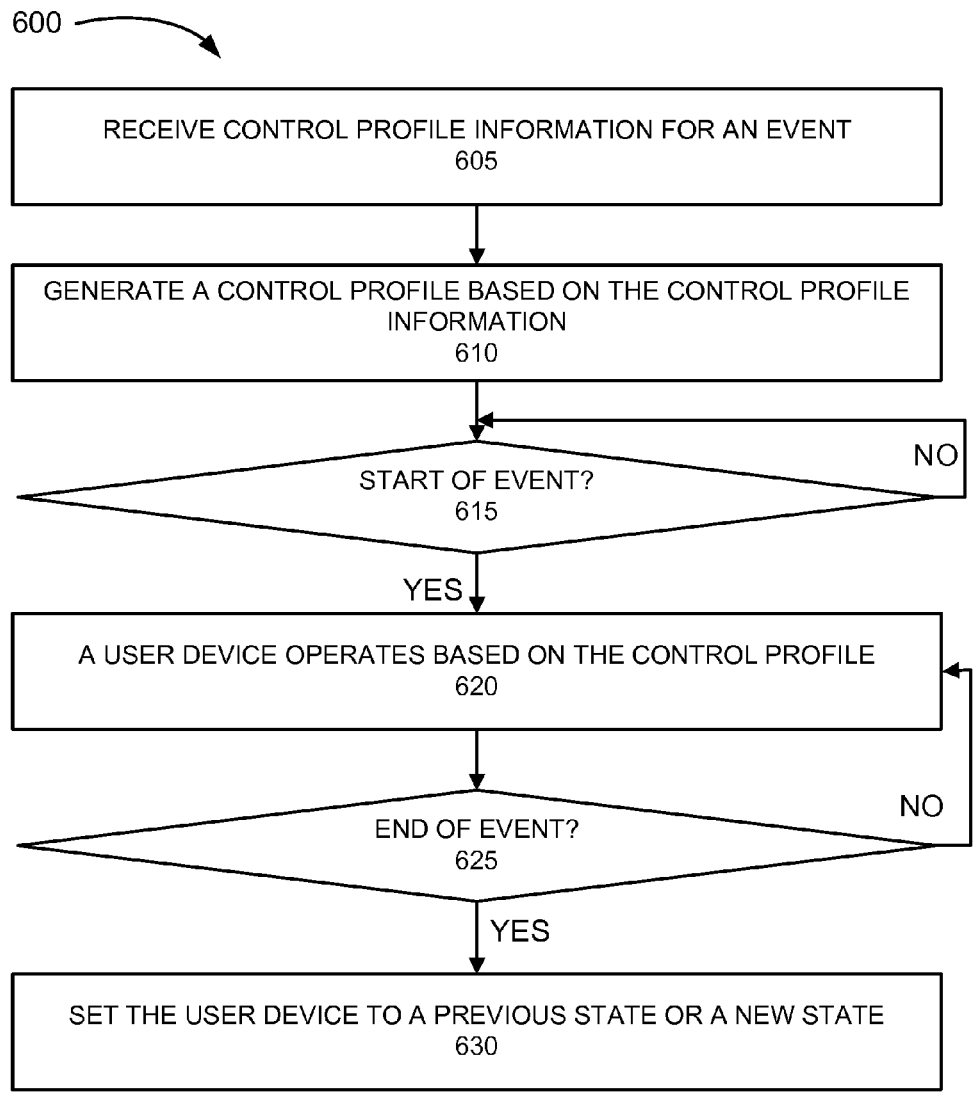
FIG. 6 is a flow diagram illustrating an exemplary process for controlling the operation of a user device based on the control profile.

FIG. 6 is a flow diagram illustrating an exemplary process for controlling the operation of a user device based on the control profile. According to an exemplary embodiment, process 600 may be performed by user device 110 that includes control client 115.

Control profile information may be received for an event (block 605). For example, as previously described, control client 115 may receive control profile information from various sources, such as, for example, user 120, pictures, videos, location information, a network (e.g., a device associated with a service provider, a device associated with an event holder, etc.), and/or a broadcast message. The control profile information may include, for example, event information, device setting information, state information, etc., as previously described.

A control profile may be generated based on the control profile information (block 610). For example, as previously described, control client 115 may generate a control profile that may be used to control the state of user device 110 and/or control one or multiple operations associated with user device 110 during the event. For example, the control profile may take the form of a file, data, etc.

It may be determined when the event begins (block 615). If it is determined that the event has not begun, control client 115 may continue to wait until the event begins. If it is determined that the event has begun (block 615—YES), then a user device may operate based on the control profile (block 620). For example, control client 115 may determine when the event begins based on the control profile. User device 110 may operate based on the control profile for the duration of the event. As previously described, depending on the control profile, the state of user device 110 and/or how user device 110 operates during the event may be static or not. For example, according to some embodiments, one or more parameters (e.g., user device settings, etc.) may be static throughout the duration of the event. According to other embodiments, one or more parameters may change during the course of the event. In this way, the state of user device 110 may transition from one state to another state during the event in correspondence to the user's activities or sub-events occurring during the event.

It may be determined whether the event ends (block 625). If it is determined that the event did not end, the user device may continue to operate based on the control profile. If it is determined that the event ended (block 625—YES), then the user device may operate according to a new state or a previous state (block 630). For example, user device 110 may automatically operate based on new state information or previous state information and/or release user device 110 from operating based on the control profile and allow user device 110 to operate according to a previous state (e.g., before the event).

Although FIG. 6 illustrates an exemplary process 600 for controlling the operation of user device 110 based on the control profile, according to other implementations, process 600 may include additional operations, fewer operations, and/or different operations than those illustrated in FIG. 6 and described. For example, control client 115 may set non-local settings during the event and reset the non-local settings once the event transpires.

Figure 7:
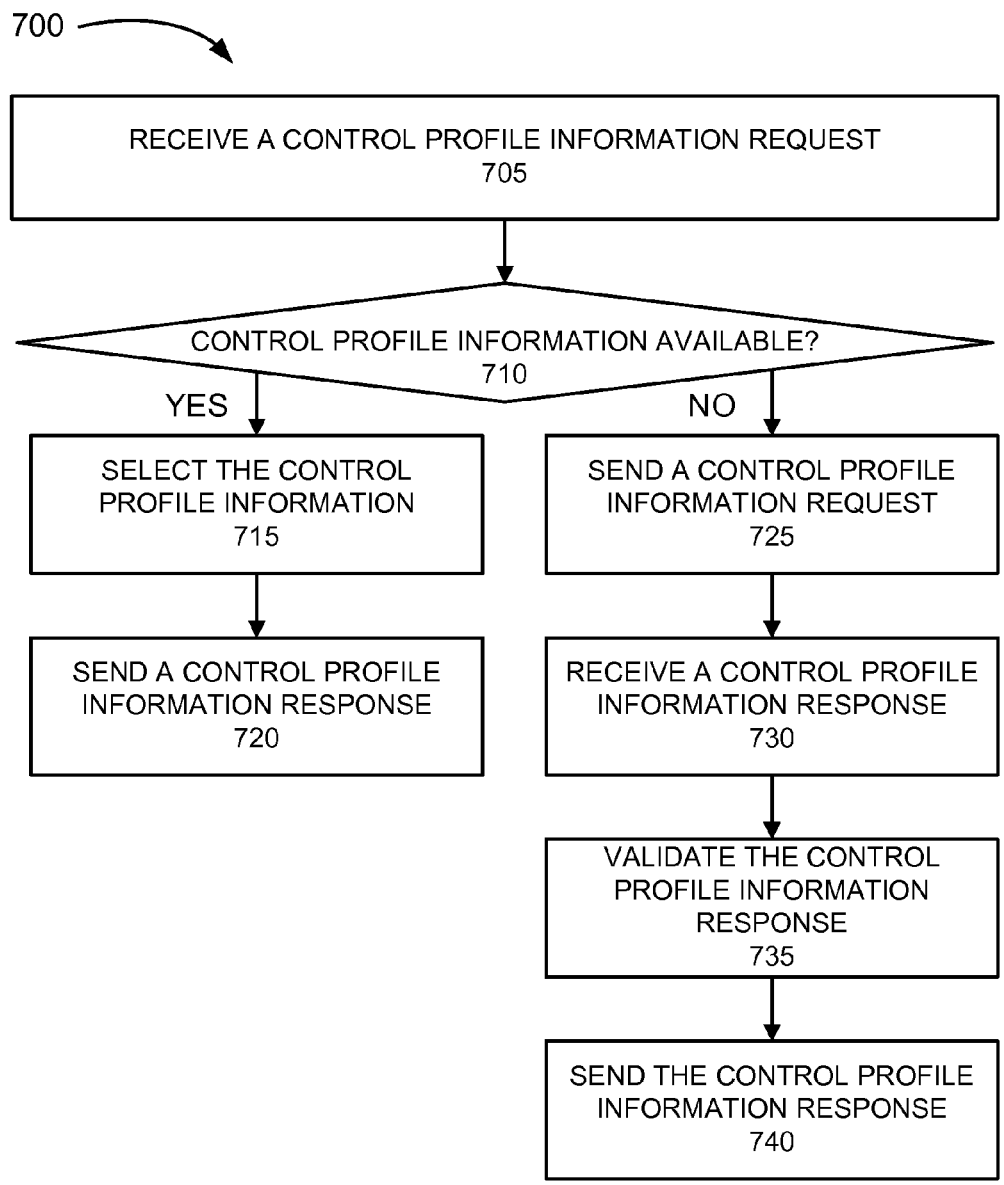
FIG. 7 is a flow diagram illustrating an exemplary process for providing control profile information or a control profile to user device.

FIG. 7 is a flow diagram illustrating an exemplary process for providing control profile information or a control profile to user device 110. According to an exemplary embodiment, process 700 may be performed by a device associated with a service provider (e.g., server 510 or some other type of device).

A control profile information request may be received (block 705). For example, as previously described, server 510 may receive a request from user device 110 for control profile information or a control profile pertaining to an event.

It may be determined whether control profile information is available (block 710). For example, according to an embodiment, server 510 may perform a local look-up for control profile information or a control profile pertaining to the event. For example, a device (e.g., server 515) may update server 510 with control profile information or a control profile relating to the event.

If it is determined that control profile information is available (block 710—YES), control profile information may be selected (block 715). For example, when server 510 determines that the control profile information or the control profile is present, server 510 may select the control profile information or the control profile. Thereafter, the control profile information or the control profile may be sent to user device (block 720). For example, server 510 may send the selected control profile information or the control profile to user device 110 via base station 505.

If it is determined that control profile information is not available (block 710—NO), a control profile information request may be sent (block 725). For example, according to an exemplary embodiment, server 510 may not perform a local look-up and/or may not receive control profile information or control profiles from server 515. Rather, server 510 may receive the control profile information request (e.g., from user device 110) and send a control profile information request to server 515.

A control profile information response may be received (block 730). For example, server 510 may receive a control profile information response from server 515, in response to the control profile information request sent.

The control profile information response may be validated (block 735). For example, server 510 may validate the control profile information response as a security measure to avoid unsolicited or bogus control profile information or control profile. By way of example, server 510 may validate the control profile information response based on a comparison between the control profile request from user device 110 and the control profile information response from server 515. According to other embodiments, server 510 may use other conventional methods to validate the control profile information response.

The control profile information response may be sent to user device (block 740). For example, assuming the control profile information response is validated, server 510 may send the control profile information response to user device 110. If the control profile response is not validated, server 510 may perform other security measures and not send the control profile information response. Additionally, or alternatively, server 510 may notify user 120.

Although FIG. 7 illustrates an exemplary process 700 for providing control profile information or a control profile to user device 110, according to other implementations, process 700 may include additional operations, fewer operations, and/or different operations than those illustrated in FIG. 7 and described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIG. 6 and FIG. 7, the order of the blocks may be modified according to other embodiments. Further, non-dependent blocks may be performed in parallel. Additionally, with respect to other processes described in this description, the order of operations may be different according to other embodiments and/or operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, a combination of hardware, software and firmware, a combination of hardware and firmware, or software.

In the preceding description, various embodiments have been described with reference to the accompanying drawings. It will, however, be evident that various modifications and changes may be made thereto, and additional embodiments may be implemented, without departing from the broader scope of the invention as set forth in the claims that follow. The description and the drawings are accordingly to be regarded as illustrative rather than restrictive.

No element, act, and/or instruction described and/or illustrated in the present application should be construed as critical or essential to the implementations described herein unless explicitly described as such.

What is claimed is:

1. A method comprising:
receiving control profile information that includes configuration data that provides settings of a user device, wherein the configuration data includes at least one of a picture or a video, and event data that indicates any of a date, a time, or a location pertaining to an event associated with a user of the user device for which the configuration data is used;
generating a control profile file based on the control profile information, wherein the control profile file includes settings data for the user device, which when executed by a control application, controls operations of the user device during the event;
storing the control profile file;
determining when the event begins;
controlling the operations of the user device, based on the control profile file, for a duration of the event in response to determining that the event begins; and
automatically setting the user device to a previous state or a new state after the event transpires.

2. The method of claim 1, wherein the receiving the control profile information comprises one or more of:
receiving the control profile information from the user via the user device; or
receiving the control profile information from another device.

3. The method of claim 2, wherein the receiving the control profile information from another device comprises:
sending a control profile request to the other device; and
receiving a control profile response from the other device, wherein the control profile response includes the control profile information.

4. The method of claim 2, wherein the receiving the control profile information from another device comprises:
receiving a broadcast message that includes the control profile information.

5. The method of claim 1, wherein the receiving the at least one of the picture or the video further comprises:
scanning the at least one of the picture or the video; and
identifying the configuration data in the at least one of the picture or the video based on at least one of object recognition or text recognition.

6. The method of claim 1, wherein the controlling comprises one or more of:
controlling a cue provided to the user when an incoming message is received by the user device; or
controlling a mode of the user device.

7. The method of claim 1, further comprising:
sending a message to a network to change an on-line status of the user during the event.

8. The method of claim 1, wherein the control profile information includes one or more of the duration of the event or a start time and an end time of the event.

9. A device comprising:
a communication interface;
a memory, wherein the memory stores instructions;
a processor, wherein the processor executes the instructions to:
receive control profile information that includes event data that indicates any of a date, a time, or a location pertaining to an event associated with a user of the device for which configuration data is used, and the configuration data that provides settings of the device, wherein the configuration data includes at least one of a picture or a video;
generate a control profile file based on the control profile information to control a state of the device, during the event, wherein the control profile file includes settings data for the device;
determine when the event occurs;
operate the device, based on the control profile file, during the event; and
automatically set the device to a previous state or a new state after the event transpires.

10. The device of claim 9, wherein the control profile file includes information pertaining to a cue provided to the user when an incoming message is received.

11. The device of claim 9, wherein the control profile file includes information pertaining to a mode of the device.

12. The device of claim 9, wherein the control profile file includes settings data that change during the event.

13. The device of claim 9, wherein the processor executes the instructions to:
update a non-local setting associated with the user based on the control profile file including one or more of an Instant Messaging status or a social network status.

14. The device of claim 9, wherein the event corresponds to a social activity or a business activity associated with the user.

15. The device of claim 9, wherein the processor executes the instructions to:
perform an electronic purchase pertaining to an attendance, by the user, of the event; and
receive, via the communication interface, the control profile information from another device in response to the electronic purchase.

16. The device of claim 9, wherein the event is an ad hoc event associated with the user.

17. The device of claim 9, wherein the processor executes the instructions to:
receive the at least one of the picture or the video; and
identify configuration data in the at least one of the picture or the video based on at least one of object recognition or text recognition.

18. A method comprising:
receiving a control profile information request for control profile information or a control profile that controls one or more operations of a user device during an event associated with a user and automatically sets the user device to a previous state or a new state after the event transpires;
accessing a database that includes control profile information or control profiles;
selecting control profile information or a control profile based on information included in the control profile information request;
sending a control profile information response to the user device that includes the control profile information or the control profile; and
sending update data that updates the control profile information or the control profile in response to one or more changes that occur before the event or during the event, wherein the one or more changes include at least one of a start time of the event, an end time of the event, or a cancellation of the event.

19. The method of claim 18, wherein the control profile information request includes information relating to the event.

20. The method of claim 18, wherein the method is performed by a device associated with a service provider, and the method further comprises:
receiving the control profile information or the control profile from a device associated with an event holder; and
generating the control profile information response that includes the control profile information or the control profile received from the device associated with the event holder.

21. The method of claim 20, further comprising:
validating the control profile information or the control profile from the device associated with the event holder based on a comparison of the control profile information request and the control profile information or the control profile received from the device associated with the event holder.

22. A device comprising:
a communication interface that includes a transmitter and a receiver;
a memory, wherein the memory stores instructions;
a processor, wherein the processor executes the instructions to:
receive, via the communication interface, a control profile information request for control profile information or a control profile that controls one or more operations of a user device during an event associated with a user and automatically sets the user device to a previous state or a new state after the event transpires;
send, via the communication interface, a control profile information request to another device based on the control profile information request received;
receive, via the communication interface, a control profile information response from the other device;
send, via the communication interface, the control profile information response to the user device that includes the control profile information or the control profile; and
send, via the communication interface, update data that updates the control profile information or the control profile in response to one or more changes that occur before the event or during the event, wherein the one or more changes include at least one of a start time of the event, an end time of the event, or a cancellation of the event.

23. The device of claim 22, wherein the processor executes the instructions to:

determine whether the control profile information response from the other device is valid.

24. The device of claim 22, wherein the control profile information request includes event information.

25. The device of claim 24, wherein the event corresponds to a social activity or a business activity associated with the user.

* * * * *